(12) United States Patent
Sun et al.

(10) Patent No.: US 6,991,884 B2
(45) Date of Patent: Jan. 31, 2006

(54) CHEMICALLY PREPARED TONER AND PROCESS THEREFOR

(75) Inventors: Jing X. Sun, Lexington, KY (US); Bradley Leonard Beach, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 138 days.

(21) Appl. No.: 10/703,174

(22) Filed: Nov. 6, 2003

(65) Prior Publication Data

US 2004/0137348 A1    Jul. 15, 2004

Related U.S. Application Data

(63) Continuation-in-part of application No. 09/921,486, filed on Aug. 3, 2001, now Pat. No. 6,652,634.

(51) Int. Cl.
*G03G 9/097*    (2006.01)
*G03G 9/087*    (2006.01)

(52) U.S. Cl. .................... 430/108.3; 430/108.4; 430/108.5; 430/108.8; 430/109.3; 430/110.1; 430/110.4; 430/111.4; 430/137.14

(58) Field of Classification Search ............ 430/108.3, 430/108.4, 108.5, 108.8, 109.3, 110.1, 110.4, 430/111.4, 137.14
See application file for complete search history.

(56) References Cited

U.S. PATENT DOCUMENTS

| | | | |
|---|---|---|---|
| 4,983,488 A | 1/1991 | Tan et al. | |
| 5,059,456 A | 10/1991 | Larson et al. | |
| 5,066,560 A | 11/1991 | Tan et al. | |
| 5,589,522 A | 12/1996 | Beach et al. | |
| 5,714,538 A | 2/1998 | Beach et al. | |
| 5,719,204 A | 2/1998 | Beach et al. | |
| 5,863,696 A | 1/1999 | Koyama et al. | |
| 5,869,564 A | 2/1999 | Beach et al. | |
| 5,944,883 A | 8/1999 | Saibara et al. | |
| 5,945,245 A | 8/1999 | Mychajlowskij et al. | |
| 5,958,640 A | 9/1999 | Hasegawa et al. | |
| 6,132,919 A | 10/2000 | Ogawa et al. | |
| 6,153,346 A | 11/2000 | Machata et al. | |
| 6,221,957 B1 | 4/2001 | Nzudie et al. | |
| 6,225,370 B1 | 5/2001 | Suthar et al. | |
| 6,248,494 B1 | 6/2001 | Yamazaki et al. | |
| 6,268,103 B1 | 7/2001 | Hopper et al. | |
| 6,463,253 B2 | 10/2002 | Sato | |
| 6,531,254 B1 | 3/2003 | Bedells et al. | |
| 6,531,256 B1 | 3/2003 | Bedells et al. | |
| 2003/0134218 A1 | 7/2003 | Bedells et al. | |

FOREIGN PATENT DOCUMENTS

JP         60220358         11/1985

*Primary Examiner*—Mark A. Chapman
(74) *Attorney, Agent, or Firm*—John A. Brady; David E. LaRose

(57) ABSTRACT

A chemically prepared toner for electrophotographic printers and method therefor using a unique polymeric dispersant. The chemically prepared toner includes agglomerated polymeric dispersant stabilized pigment particles, a fuser release agent, a charge control agent dispersion, and a self-stabilized essentially surfactant free latex binder. The polymeric dispersant includes at least three segments, a hydrophilic polymeric segment, a hydrophobic polymeric segment, and a protective colloid or reactive surfactant segment. The weight average molecular weight range of the dispersant ranges from about 5,000 to about 30,000, and a hydrophobicity ranging from about 10 to about 90 percent by weight. The chemically prepared toner includes agglomerated toner particles have a unimodal particles size distribution with a number average particle size (N) ranging from about 5.0 to about 8.5 microns and a volume average particle size (V) ranging from about 5.0 to about 8.5 microns.

19 Claims, No Drawings

CHEMICALLY PREPARED TONER AND PROCESS THEREFOR

RELATED APPLICATIONS

This application is a continuation-in-part of application Ser. No. 09/921,486, filed on Aug. 3, 2001, now U.S. Pat. No. 6,652,634 B1.

FIELD OF THE INVENTION

The invention relates to chemically prepared toner compositions and improved methods for making toners for electrophotographic printer applications.

BACKGROUND OF THE INVENTION

Toners for use in electrophotographic printers include two primary types, namely chemically prepared toners (CPT) and toners made by a mechanical grinding process. CPT has significant advantages over toners made by a mechanical grinding process. In a mechanical grinding process, particle breakage is difficult to control and minimize. Also the shape of mechanically ground particles is more irregular than CPT particles. Hence, the particle size distribution of mechanically ground toner particles is relatively broader than for CPT particles.

There are several types of CPT, depending on the process used to make the CPT. CPT are generally classified as a suspension toner, an emulsion aggregation toner, a dispersion toner, or a chemically milled toner. Of the foregoing, a suspension toner is made by the simplest process. However, the shape of a suspension toner is limited to spherical, and the size distribution of such toner is dependent on how the toner ingredients are dispersed in a monomer used to make the toner. On the other hand, an emulsion aggregation toner involves a more complex process. However, the emulsion aggregation process provides a toner having a relatively narrower size distribution, and the shape and structure of the toner particles are more controllable.

In a typical emulsion aggregation chemically prepared toner process, the toner components include pigment, wax, and a latex binder which are dispersed by use of surfactants. In general, surfactants are typically relatively hydrophilic and consist of low molecular weight molecules or oligomers. These surfactants provide kinetic stability but insufficient thermal stability to the system. A general method of agglomeration of the particles is a method which destabilizes the dispersion, for example, by an acid/base reaction, a cationic/anionic precipitation method, a metal complex additive or by salt precipitation. During the agglomeration process, the surfactant is easily removed from the surface of the particles resulting in particle agglomeration. Hence, the agglomeration process is relatively extreme and fast. However, particle size and particle size distribution of the resulting agglomerated particles are greatly influenced by the stability of the dispersion. Since the surfactant cannot often provide enough stability to the system, excess surfactant is typically added during or after the agglomerating step to provide stability for the newly formed particles. Because there is an excess of surfactant in the system, all of the surfactant is not firmly attached to the agglomerated particles. This excess surfactant is difficult to separate from the product. Unfortunately, excess surfactant results in printing problems such as humidity sensitivity, difficulty in charge control, and other printing problems.

Hence, there continues to be a need for improved chemically prepared toners and to methods which enable easier control of particle size for toners used in electrophotographic printers.

SUMMARY OF THE INVENTION

With regard to the above, the invention provides a chemically prepared toner for electrophotographic printers and method therefor using a unique polymeric dispersant. The chemically prepared toner includes agglomerated polymeric dispersant stabilized pigment particles, a fuser release agent, a charge control agent dispersion, and a self-stabilized essentially surfactant free latex binder. The polymeric dispersant includes at least three segments, a hydrophilic polymeric segment, a hydrophobic polymeric segment, and a protective colloid or reactive surfactant segment. The weight average molecular weight range of the polymeric dispersant ranges from about 5,000 to about 30,000 as determined by gel permeation chromatography, and the dispersant has a hydrophobicity ranging from about 10 to about 90 weight percent. The chemically prepared toner includes agglomerated toner particles have a unimodal particles size distribution with a number average particle size (N) ranging from about 5.0 to about 8.5 microns and a volume average particle size (V) ranging from about 5.0 to about 8.5 microns wherein the V minus N (V-N) ranges from about 0 to about 1.5.

In another embodiment, the invention provides a method for making toner particles for electrophotographic printers. The method includes the steps of dispersing pigment, a fuser release agent, and a charge control agent with a polymeric dispersant in a medium. The dispersed pigment, fuser release agent, and charge control agent are then contacted with a latex binder and the polymeric dispersant to provide a toner mixture. The polymeric dispersant has a hydrophilic polymeric segment, a hydrophobic polymeric segment, and a protective colloid or reactive surfactant segment, and has a weight average molecular weight ranging from about 5,000 to about 30,000 as determined by gel permeation chromatography, and the dispersant has a hydrophobicity ranging from about 10 to about 90 percent by weight. A destabilizing agent is added to the toner mixture while stirring the mixture at an elevated temperature to agglomerate and form toner particles. The agglomerated toner particles have a unimodal particles size distribution with a number average particle size (N) ranging from about 5.0 to about 8.5 microns and a volume average particle size (V) ranging from about 5.0 to about 8.5 microns wherein the V minus N (V-N) ranges from about 0 to about 1.5.

An advantage of the invention is that it enables production of chemically prepared toner particles having a relatively narrow particles size distribution. Another advantage of the invention is that the toner particles recovered from the process are substantially free of surfactant. By "substantially free" means that the toner particles do not contain sufficient migratable surfactant as made by the process to effect toner charge transfer sensitivity. In one embodiment, the process is conducted in a substantially surfactant free environment, hence there is no need to remove surfactant from the toner particles thereby simplifying the toner production process. The process also has the advantage of greatly reducing the reaction time and temperature required to make the toner particles.

For the purposes of describing the invention, all percentages and ratios, used herein, are "by weight" unless otherwise specified. All molecular weights, used herein, are weight average molecular weights unless otherwise specified. As used herein, the term "pigment" refers to an insoluble colorant (including organic and inorganic pigments). The term "colorant" refers to pigments and dyes as used for printing inks and toners. The term "migratable" means free or un-reacted surfactant that is adsorbed onto the surface of the toner particles. The term "hydrophobicity" relates to the weight percent of the hydrophobic monomeric components and/or chain transfer agents in the terpolymer.

A key feature of the invention is the use of certain high molecular weight, polymeric dispersants in the chemically prepared toner process. These specific dispersants provide strong interaction ability with the surface of the pigment particles to overcome the excess surfactant problem described above and provide a smoother more easily controllable agglomeration process. The dispersant also enables use of a substantially surfactant free agglomeration process. The process specifically provides the ability to control the particles size distribution and toner properties of the toner particles.

The polymeric dispersant described herein is stabilized in an aqueous medium by its carboxylic acid functionality. Accordingly, the polymeric dispersant is sensitive to pH, multivalent metal salts, and certain organic solvents. The specific hydrophobic groups of the dispersant, described below, can firmly attach to or be absorbed on the surface of the pigment particles so that the dispersant is captured in the particles and is non-migratable therefrom. Additionally, the polymeric dispersant itself can provide sufficient charge control ability for the agglomerated toner particles.

Further details and advantages of the invention are set forth below in more detail.

DETAILED DESCRIPTION OF THE PREFERRED EMBODIMENTS

The invention relates to toner particles used to make chemically prepared toners and to a process for agglomerating the particles to make chemically prepared toners using a polymeric dispersant. The toner particles agglomerated by the process include a colorant, a fuser release agent, a binder and a dispersant.

Colorant

The colorant may be selected from any of the pigments, dyes, and mixtures thereof commonly used in electrophotographic printers. Pigments may be selected from organic and inorganic pigments, including but not limited to azo pigments such as azo lakes, insoluble azo pigments, condensed and chelate azo pigments; polycyclic pigments such as phthalocyanines, anthraquinones, quinacridones, thioindigoids, isoindolinones, and quinophthalones, benzimidazolones, bisacetoarylides, nitro pigments, daylight fluorescent pigments; carbonates; chromates, titanium oxides; zinc oxides; iron oxides, magnetites and carbon blacks. Preferred pigments include carbon black, Pigment Red 122, Pigment Red 202, Pigment Yellow 74, Pigment Yellow 128, Pigment Yellow 138, Pigment Yellow 155, Pigment Yellow 180, Pigment Blue 15:3 and Pigment Blue 15:4.

The pigments may also include surface modified pigments. Surface modified pigments include pigments having grafted on the surface thereof groups which enhance the hydrophilic or hydrophobic properties of the pigments. For example, in order to increase the dispersibility of pigments in an aqueous medium, hydrophilic groups and/or hydrophilic groups may be formed on the surface of the pigments. Such groups enhance the ease of dispersing the pigments in an aqueous medium for conducting the agglomeration process described below. The colorant is preferably present in the agglomerated toner particles in an amount by weight ranging from about 4 to about 15% of the total weight of the toner particles.

Fuser Release Agent

The fuser release agent is preferably a wax. Waxes suitable for use in preparing the chemically prepared toners according to the invention include polyolefin waxes, metal salts of fatty acids, fatty acid esters, partially saponified fatty acid esters, higher fatty acid esters, higher alcohols, paraffin waxes, amide waxes, and polyhydric alcohol esters. The polyolefin waxes include, but are not limited to, polyolefins selected from polypropylenes, polyethylenes, polybutenes, polypropylene/polyethylene copolymers, and blends comprising polyethylenes, polypropylenes or poly α-olefins. Suitable metal salts of fatty acids include metal salts of maleic acid adducts of saturated hydrocarbons, metal salts of stearic acid, metal salts of oleic acids, metal salts of palmitic acids, metal salts of linoleic acids and metal salts of ricinoleic acid. Suitable fatty acid esters include ethylmaleate, butylmaleate, methyl stearate, butyl stearate, cetyl palmitate, and ethylene glycol montanic acid ester. Partially saponified fatty acid esters include montanic acid esters partially saponified with calcium. Higher fatty acids esters include esters of dodecanoic acid, lauric acid, myristic acid, palmitic acid, stearic acid, oleic acid, linoleic acid, ricinoleic acid, arachic acid, behenic acid, lignoceric acid, selacholeic acid. Suitable higher alcohols include dodecyl alcohol, lauryl alcohol, myrisyl alcohol, palmityl alcohol, stearyl alcohol, arachyl alcohol, and behenyl alcohol. Suitable paraffin waxes include natural paraffins, synthetic paraffins, Fischer-Tropsch wax, rice wax, carnauba wax, and chlorinated hydrocarbons. Suitable amide waxes include stearamide, oleamide, palmitamide, lauramide, behenamide, methylene bisstearamide, and ethylene bisstearamide. Suitable polyhydric alcohol esters include glycerol stearate, glycerol ricinoleate, glycerol monobehenate, sorbitan monostearate, propylene glycol monostearate and sorbitan trioleate.

Preferred waxes include linear or branched polyalkylene waxes such as polyethylenes, polypropylenes, ethylene propylene copolymers, and mixtures thereof. In one embodiment preferred waxes are synthetic wax, such as synthetic polyolefin waxes. In one embodiment the wax is selected from the group consisting of polyethylene waxes, polypropylene waxes, and mixtures thereof. The wax may be free of natural waxes such as carnauba wax, rice wax, jojoba oil wax, Fischer-Tropsch wax, and bees wax.

Generally the melting point of the wax is in the range from about 60° C. to about 135° C., preferably about 70° C. to about 120° C. The wax is preferably present in the agglomerated toner particles in an amount by weight ranging from about 2 to about 14% based on the total weight of the toner particles. Particularly preferred waxes are available from Baker Hughes of Houston, Tex. under the trade name POLYWAX 500 and POLYWAX 750, and a wax available from NOF Corporation of Tokyo, Japan under the trade names WE-3, WE-4, WE-5, and WE-6. Modified polyolefins are available from Baker Hughes under the trade name CERAMER or from Clariant Corporation of Coventry, R.I., under the trade name LICOWAX.

Charge Control Agent

The toner may optionally include a charge enhancing additive. Charge enhancing additives are usually present in an amount of from about 0.01 to about 5, and preferably 0.01 to about 3 weight percent. Such charge control agents include the sulfonated copolymers disclosed in U.S. Pat. No. 4,883,735 to Watanabe et al.; the sulfonated styrene-acrylate ester copolymers as disclosed in U.S. Pat. No. 5,073,469 to Diaz et al., and the calix(n)arene compounds as disclosed in U.S. Pat. No. 5,318,883 to Yamanaka, et al., all of which are incorporated herein by reference. Also useful are negative charge control agents such as the organic metal complexes (e.g. metal complexes of alkyl-substituted salicylic acid) as disclosed in U.S. Pat. No. 5,437,949 to Kanbayashi, et al. and U.S. Pat. No. 5,256,512 to Kobayashi, et al., both of which are incorporated herein by reference. When used, a particularly preferred charge control agent is an organoboron complex of the formula:

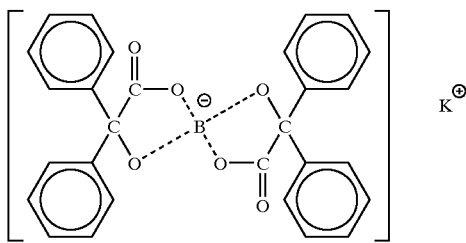

available from Japan Carlit Co., Ltd. of Tokyo, Japan under the trade name LR-147. In the alternative, the polymeric dispersant may provide sufficient charge control ability without the need to add an additional charge control agent.

Latex Binder

Another component used for forming chemically prepared toners according to the invention is a binder, preferably a latex binder that is substantially free of surfactant. The binder is preferably formed by emulsion polymerization of selected components. Particularly, a combination of first and second monomers is employed in combination with a charge stabilizing agent and an initiator. The first monomer is typically regarded as a harder monomer, i.e., a monomer having a higher glass transition temperature Tg, while the second monomer is conventionally considered a softer monomer, i.e., a monomer having a relatively lower glass transition temperature Tg. Reference within the present disclosure to the glass transition temperature of a monomer refers more specifically to the glass transition temperature of a homopolymer formed from the particular monomer. More specifically, the latex binders are formed from first monomer having a glass transition temperature Tg greater than about 70° C. and comprising styrene, substituted styrene, methyl methacrylate or a mixture thereof. Substituted styrenes include alkyl-substituted styrenes, halogen-substituted styrenes and the like. In a preferred embodiment, the first monomer, or mixture thereof, has an average glass transition temperature Tg of about 100° C., or greater.

The second monomer has a glass transition temperature Tg less than about 0° C. and comprises at least one $C_2$–$C_{10}$ alkyl acrylate. Examples of suitable alkyl acrylates include, but are not limited to, ethyl acrylate, propyl acrylate, butyl acrylate, octyl acrylate, ethylhexyl acrylate, and lauryl acrylate. Preferably, the second monomer has a glass transition temperature Tg less than about –25° C., and more preferably less than about –50° C. The ratio of the first and second monomers may be varied so that the latex binder has a glass transition temperature Tg in the range of from about 50° C. to 65° C. and depending on additional desired properties for the latex binder.

The glass transition temperature of the binder comprising a random co-polymer of the first and second monomers varies monotonically with the composition of the copolymer and with the glass transition temperatures of homopolymers made from the monomers. Accordingly, the final glass transition temperature Tg of the binder can be approximated by the empirical formula:

$$1/Tg = w1/Tg1 + w2/Tg2$$

where w1 and w2 are the weight fractions of the individual monomers in the copolymer having glass transition temperatures of Tg1 and Tg2, respectively. In a preferred embodiment, however, the latex binder is formed from at least about 50 weight percent of the first monomer, based on the weight of the first and second monomers, and more preferably comprises at least about 75 to 85 weight percent of the first monomer, based on the weight of the first and second monomers. The final Tg of the binder is selected based on the machine fusing temperature for a machine using the toner.

Another type of monomer may be optionally used as a third monomer to make the binder. This type of monomer is typically non-ionic but has hydrogen bonding capabilities. For example, monomers such as 2-hydroxyethyl methacrylate, carprolactone 2-(methacrylolyloxy)ethyl ester, or 2-(methacryloloxy)ethyl acetoacetate may be used. Such monomers can provide extra stability to the binder particularly in alcoholic/aqueous systems and can provide binding sites with metal salts.

In a preferred embodiment, another type of monomer may be selected as the charge stabilizing agent such as methacrylic acid, acrylic acid, styrenesulfonic acid, and 2-acrylamido-2-methyl-1-propane sulfonic acid. The charge stabilizing agent is preferably used in an amount ranging from about 0.5% to about 3.0% by weight of the emulsion polymerization components. However excess charge stabilizing agent may make the system too stable thereby preventing agglomeration or generating small particles during the agglomeration step of the process.

Another component of the binder is a molecular weight regulator. Typically, alkyl or aryl mercaptans are used as molecular weight regulators. Examples of molecular weight regulators include, but are not limited to, butyl mercaptan, dodecyl mercaptan, phenylethyl mercaptan, and the like. Cross-linking of the monomers may be provided by using divinyl benzene, allyl methacrylate, or diacrylate. The amount of molecular weight regulator used is determined by the desired rheology and softening point of the toner. A particularly preferred latex binder has a weight average molecular weight in the range of from about 30,000 to about 70,000, most preferably about 45,000 as determined by gel permeation chromatography, and is stable in acidic environments.

The emulsion polymerization process for making the binder is conducted in accordance with conventional polymerization techniques, for example in a semi-batch process. The latex is synthesized by free radical initiated polymerization, and any free radical initiator known in the art may be used. Preferably, the initiator comprises an ionic acid such as a per compound, for example, persulfate from Aldrich Chemical Co., Inc. of Milwaukee, Wis., or 4,4' azo-bis(4-cyanovaleic acid) available from Waco Chemical and Supply Co. of Dalton, Ga. under the trade name V-501. Persulfate initiators such as ammonium or potassium persulfate are particularly preferred. The initiator may be employed in an amount of at least about 0.001 weight percent, based on the weight of the emulsion polymerization components. In the following example, a process for making a latex binder is illustrated. The example is provided for illustrative purposes only, and are not intended to restrict or limit the scope of the invention.

LATEX BINDER EXAMPLE

In this example, the preparation of a latex binder suitable for use in forming chemically prepared toner particles of the invention is described. A solution was made by mixing 10.5 grams of methacrylic acid, 4.8 grams of 2-hydroxyethyl methacrylate, 796 grams of styrene, 226 grams of butylacrylate, and 16.2 grams of dodecylmercaptan in a first round bottom flask. To a second round bottom flask equipped with a thermometer, a pressure equalized addition funnel and a nitrogen gas connector, 1350 grams of deionized water was added and degassed with nitrogen. The water was heated to about 75° C. and 6.0 grams of ammonium persulfate was added and the flask maintained at this temperature for 30 minutes. Styrene sulfonic acid sodium salt (2.6 grams) was added to the second flask and the temperature was maintained at 75° C. for 10 minutes. After mixing the styrene sulfonic acid sodium salt and ammonium persulfate, the solution from the first flask was added to the second flask dropwise while maintaining the temperature at 75° C. It took about 5 to 6 hours to complete the addition of the material from the first flask to the second flask. When the addition was complete, the mixture was maintained for an additional hour at 75° C. Next, 0.3 grams of ammonium persulfate mixed in 20 mL of deionized water was added to the second flask and the reaction mixture was maintained at 75° C. for 3 to 4 more hours. Heating was then discontinued and the reaction medium was cooled to room temperature and filtered through a polypropylene mesh filter cloth. The average particle size of the latex binder was about 230 nanometers with a solids content of about 40 wt. %.

Dispersant

An important feature of the invention is the use of a particular polymeric dispersant for agglomerating the toner particles. The dispersant is a graft co-polymer, preferably a ter-polymer made by a free radical polymerization process. The graft co-polymer preferably contains at least two components, a hydrophilic component and a protective colloid component. More preferably, the polymeric dispersant contains at least three functional parts, namely a hydrophilic component, a hydrophobic component, and protective colloid component. For making chemically prepared toner, the polymeric dispersant preferably has a weight average molecular weight ranging from about 5,000 to about 30,000 as determined by gel permeation chromatography and a hydrophobicity ranging from about 10 to about 90 percent by weight, preferably from about 30 to about 70 percent by weight, and most preferably from about 35 to about 55 percent by weight.

The hydrophilic component of the polymeric dispersant is preferably an ionic monomer segment which may be selected from acrylic acid, methacrylic acid, crotonic acid, or other carboxylic acid containing monomers. The hydrophilic segment preferably provides a polymeric backbone for the dispersant and is sensitive to environmental changes. Accordingly, the hydrophilic component plays an important role in stabilizing or destabilizing the dispersions.

The hydrophobic component of the polymeric dispersant preferably contains electron rich functional groups. Such functional groups exhibit strong interaction or adsorption properties with respect to particles surfaces such as the colorant and fuser release agent particles. Preferred groups that provide the electron rich functional groups include nonylphenyl, mono-, di-, and tri-styrene phenyl, polydimethylsiloxy, stearyl, and fluoronated hydrocarbon containing groups. Examples of such monomers include, but are not limited to, polymerizable monofunctional vinyl monomers from Toagosei Co. of Tokyo, Japan under the trade name ARONIX M-117, mono-methacryloxypropyl terminated polydimethylsiloxane from Gelest, Inc. of Morrisville, Pa. under the trade name MCR-M11, and polydimethylsiloxane-co-polypropylene glycol methacrylate.

Another important component of the polymeric dispersant is the protective colloid component. This component provides extra stability to the ter-polymer in aqueous systems. Use of this component substantially reduces the amount of ionic monomer component needed thereby increasing the hydrophobicity and sensitivity of the polymeric dispersant. This component also helps to stabilize the dispersion in lower acidic and in aqueous/alcoholic media. Under such conditions the carboxylic functionality of the ter-polymer is ineffective for inducing dispersion stability.

However, the protective colloid component acts to buffer the dispersion during the agglomeration process which helps to effectively control particle size growth and size distribution of the toner particles.

The protective colloid component can also provide the hydrophobic functional group that has a strong interaction or attraction for the colorant and fuser release agent particles. The protective colloid component may be selected from either a reactive surfactant or a protective colloid macromer material or a non-siloxyl hydrophobic monomer.

Examples of protective colloid materials include hydroxyethylcellulose acrylate, hydroxyethylcellulose methacrylate, methoxypoly(ethyleneoxy) acrylate (containing from about 0 to about 40 moles of ethylene oxide), methoxypoly(ethyleneoxy) methacrylate (containing from about 0 to about 40 moles of ethylene oxide), methylcellulose acrylate, methylcellulose methacrylate, methylcellulose crotonate, and stearyloxypoly(ethyleneoxy) acrylate (containing from 1 to about 40 moles of ethylene oxide). Mixtures of these materials may also be used.

Non-siloxyl hydrophobic monomers may be derived from long chain aliphatic groups, long chain alcohols, and alkyl aryl alcohols. Examples of such materials preferably include stearyl or lauryl acrylate or methacrylate or nonyl phenol acrylate or methacrylate.

Examples of reactive surfactants include, but are not limited to, nonylphenoxy poly(ethyleneoxy) acrylate (containing from 1 to about 40 moles of ethylene oxide), nonylphenoxy poly(ethyleneoxy) methacrylate (containing from 1 to about 40 moles of ethylene oxide), nonylphenoxy poly(ethyleneoxy) crotonate (containing from about 1 to about 40 moles of ethylene oxide), bis-nonylphenoxy poly (ethyleneoxy) fumarate (containing from about 1 to about 40 moles of ethylene oxide), phenoxypoly(ethyleneoxy) acrylate (containing from about 1 to about 40 moles of ethylene oxide), perfluoroheptoxypoly (propyloxy) acrylate, perfluoroheptoxypoly (propyloxy) methacrylate, sorbitol acrylate, sorbitol methacrylate, and allyl methoxy triethylene glycol ether.

The protective colloid or reactive surfactant segment has a molecular weight preferably ranging from about 200 to about 2,000, preferably from about 200 to about 1,600. The colloid or reactive surfactant segment must include a moiety which enables it to attach to the backbone hydrophilic segment of the polymer. For example, the colloid or reactive surfactant segment may be attached through an acrylic group. The colloid and reactive surfactant segments contain both hydrophobic and hydrophilic moieties and not only function as surfactants in the conventional manner but also tend to effectively uniformly coat insoluble particles in a dispersion.

Preferred protective colloid or reactive surfactants which may be used in the polymeric dispersants of the invention include stearyl acrylate, stearyl methacrylate, lauryl acrylate, lauryl methacrylate, nonylphenol acrylate, nonylphenol methacrylate, nonylphenoxy poly(ethyleneoxy)$_n$ methacrylate, wherein n is from 1 to about 40, preferably from 6 to about 15; nonylphenoxy poly(ethyleneoxy)$_n$ acrylate, wherein n is from 1 to about 40, preferably from about 6 to about 15; methoxypoly(ethyleneoxy)$_n$ methacrylate, wherein n is from about 1 to about 40, preferably from about 5 to about 15; methoxypoly(ethyleneoxy)$_n$ acrylate, wherein n is from about 1 to about 40, preferably from about 5 to about 15; stearyloxypoly(ethyleneoxy)$_n$ methacrylate, wherein n is from about 1 to about 20; stearyloxypoly (ethyleneoxy)$_n$ acrylate, wherein n is from about 1 to about 20; perfluoro or highly fluorinated $C_1-C_{18}$ alkyl methacrylate; perfluoro or highly fluorinated $C_1-C_{18}$ alkyl acrylate (such as trihydroperfluoro undecyl methacrylate and trihydroperfluoro undecyl acrylate); poly(propylene glycol) methyl ether methacrylate; poly(propylene glycol) methyl ether acrylate; poly(propylene glycol) 4-nonylphenol ether methacrylate; poly(propylene glycol) 4-nonylphenol ether acrylate; methacryloxy-trimethylsiloxy-terminated polyethylene oxide, and acryloxytrimethylsiloxy-terminated polyethylene oxide.

Preferred protective colloid or reactive surfactant segments include stearyl methacrylate, stearyl acrylate, lauryl methacrylate, lauryl acrylate, nonylphenoxy PEG-5-10 methacrylate, trimethylsiloxy-terminated PEG 4-5 methacrylate, PPG-4nonylphenol acrylate, and trihydroperfluoro undecyl methacrylate, where PEG is polyethylene glycol and PPG is polypropylene glycol. Particularly preferred protective colloid materials are derived from nonlyphenyl polyethylene glycol methacrylate, mono-, di-, and tri-styrenated phenyl polyethylene glycol methacrylate, and stearyloxy polyethylene glycol ether methacrylate such as available from Rhodia, USA of Cranbury, N.J. under the trade name SIPOMER, and other monomers from Monomer-Polymer & Dajac Labs, Inc. of Feasterville, Pa.

The preferred polymeric dispersants may be represented by the following formulas:

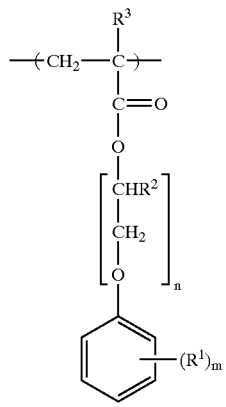

wherein n is an integer from 0 to 20, m is an integer from 1 to 3, and each $R^1$ is independently selected from $C_1-C_9$ alkyl, or aryl-$C_1-C_9$ alkyl, provided that at least one of said $R^1$ is aryl-$C_1-C_9$ alkyl, and each $R^2$ and $R^3$ is independently selected from H and —$CH_3$. In the foregoing formula, the acrylic acid moiety is polymerized to provide the backbone of the polymeric dispersant. The pendant chains of the polymer include at least one hydrophobic segment and at least one protective colloid or reactive surfactant segment as described above.

A substituted acrylate ester monomer wherein the alkyl group of the methacrylate ester is replaced with (ethylene glycol) 2,4,6-tris-(1-phenylethyl)phenyl is shown in the following formula:

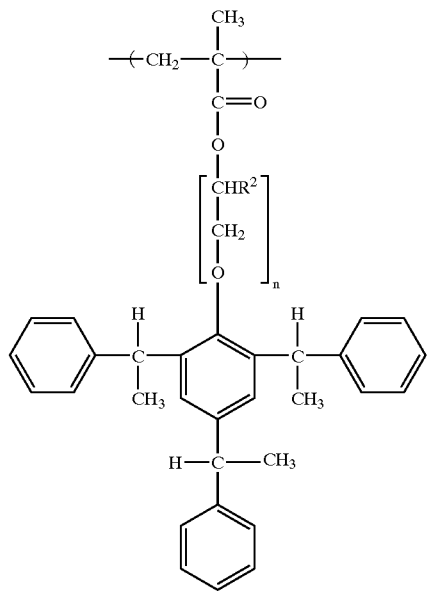

wherein n is 1 to 30, and $R^2$ is independently selected from H and —$CH_3$.

In a further embodiment of the present invention, the dispersant includes a polymer comprising a monomeric hydrophobic head and a polymeric tail, wherein the hydrophobic head is represented by the formula:

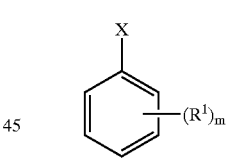

wherein m is an integer from 1 to 3, X is a polymerizable group, preferably connected to the aromatic group by —O—, —N— or —S—, and each $R^1$ is independently selected from $C_1-C_9$ alkyl, or aryl-$C_1-C_9$ alky, provided that at least one of said $R^1$ is aryl-$C_1-C_9$ alkyl. The polymeric tail comprises the formula:

or

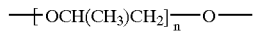

wherein n is from 0 to 30. The polymeric tail is attached to an alkylacrylo functional group that provides a polymerizable backbone for the dispersant. In a preferred embodiment, $R^1$ is a styrene functionality, X is ethylene glycol or propylene glycol, and the length of the repeating unit is from 0 to 30. In another preferred embodiment $R^1$ is nonyl and X is ethylene glycol or propylene glycol, and the length of the repeating unit is from 0 to 30.

In another embodiment, the hydrophobic segment comprises a polymer or copolymer containing electron rich functional groups comprised of a plurality of methacrylate derivatized monomers, preferably a substituted methacrylate ester monomer wherein an alkyl group on the methacrylate ester is replaced with a siloxyl substituent, preferably comprising the formula:

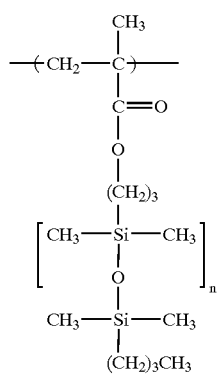

wherein n ranges from 1 to 20.

The polymeric dispersant as set forth above can be used to disperse colorant, fuser release agent, and/or a mixture thereof. The hydrophobicity of the polymeric dispersant can be varied by changing the ratios of the monomeric segments.

The hydrophilic segment of the polymeric dispersant is responsible for stabilizing the colorant in an aqueous medium at a pH above about 7. The amount of hydrophilic groups on the dispersant for the purpose of preparing chemically prepared toner is preferably as low as possible. However, a polymer having too little hydrophilic groups will adversely affect the dispersibility of the polymer. Too much of the hydrophilic groups in the polymer will make the dispersion of particles too stable to agglomerate. Introducing the protective colloid into the polymeric dispersant helps. Consequently, the preferred molar ratio of the hydrophilic segment to the hydrophobic segment and protective colloid segment preferably ranges from about 13:2:2 to about 5:10:1.

The hydrophobic segment of the polymeric dispersant is responsible for anchoring the polymeric dispersant to the colorant particles. Electron donor/acceptor interactions via aromatic groups and hydrogen bonding are preferred for effective binding between pigment particles and the dispersant. It is particularly preferred to include aromatic groups in the hydrophobic segment of the dispersant. Therefore, the preferred hydrophobic segment comprises a polymer or copolymer containing electron rich functional groups such as aromatic groups, including but not limited to alkyl aromatic groups and substituted aromatic groups.

The most preferred hydrophobic and protective colloid groups include poly (alkylene glycol) 2,4,6-tris-(1-phenylethyl) phenyl ether methacrylate and its di and mono derivatives wherein the alkylene group contains from 3 to 10 carbon atoms. A commercially available monomer for the hydrophobic and protective colloid groups includes poly (ethylene glycol) 2,4,6-tris-(1-phenylethyl) phenyl ether methacrylate available from Rhodia, USA of Cranbury, N.J. under the trade name SIPOMER/SEM 25. Other preferred hydrophobic groups include polydimethylsiloxane methacrylate from Gelest, Inc., polypropylene glycol nonylphenylether acrylate from Toagosei Co. under the trade name ARONIX M-117 and polydimethylsiloxane-co-polypropylene glycol methacrylate.

The electron rich nature of the 2,4,6-tris(1-phenylethyl) phenyl ether methacrylate makes it an excellent hydrophobic color pigment anchor. By establishing a strong interaction with the color pigment surface, this monomer stabilizes the pigment dispersion in an aqueous/alcohol medium. The hydrophobic monomer has a molecular weight of from about 200 to about 5,000, preferably of from about 300 to about 2,000.

The hydrophilic and hydrophobic segments are assembled into a graft copolymer. In a preferred embodiment, the backbone of the graft copolymer is comprised of random repeat units of MAA. (In another embodiment of the present invention, the backbone of the graft copolymer comprises random repeat units of MAA and the siloxyl substituted methacrylate ester monomer which comprises part of the hydrophobic segment.)

A further embodiment of the present invention comprises a polymer comprising random repeat units derived from:

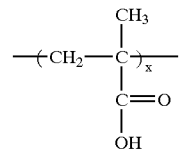

wherein x ranges from about 4 to about 20, preferably about 6 to about 12;

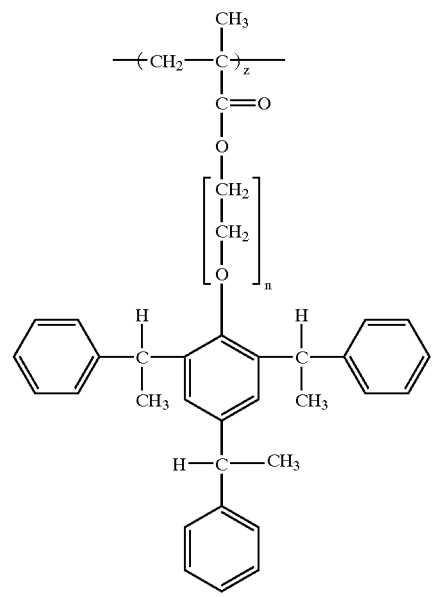

wherein z ranges from 1 to 5, preferably 1, and n ranges from 1 to 30; and

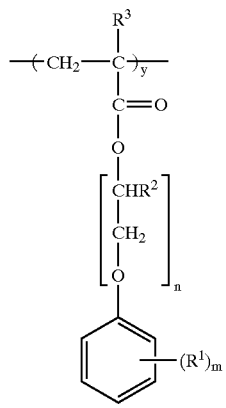

wherein y is an integer from 1 to 10, n is an integer from 1 to 20, m is an integer from 1 to 3, and each $R^1$ is independently selected from $C_1$–$C_9$ alkyl, or aryl-$C_1$–$C_9$ alkyl, provided that at least one of said $R^1$ is aryl-$C_1$–$C_9$ alkyl, and each $R^2$ and $R^3$ is independently selected from H and —$CH_3$.

The graft copolymers of the present invention can be made by standard synthetic techniques such as those described in Odian's *Principles of Polymerization*, 3rd Edition, John Wiley and Sons, Inc. (1991). However, free radical polymerization is the preferred method of synthesis.

A free radical polymerization reaction uses initiators and chain transfer agents to control the polymer molecular weight and terminate the reaction. Any conventional free radical initiator and chain transfer agent materials known in the art may be used in the present invention to make the dispersant as long as they are compatible with the reactants being used. Suitable free radical initiators include the azo-type and peroxide-type initiators (preferably the azo-type). Preferred initiators include dimethyl 2,2'-azobisisobutyrate (V-601) from Waco Chemical & Supply Co. and 2,2'-azo-bis-siobutyrylnitrile (AIBN) available from E.I. DuPont of Wilmington, Del. under the trade name VAZO 64. Preferred chain transfer agents include $C_1$–$C_{20}$ (preferably $C_8$–$C_{12}$) alkylthiol groups. Particularly preferred is n-$Cl_{12}$ thiol. Other appropriate chain transfer agents include phenylalkyl mercaptans, or 3-mercapto-1, 2propanediol.

An example of free radical polymerization of a polymeric dispersant according to the invention is illustrated below. This example is provided for illustrative purposes only, and is not intended to restrict or limit the scope of the invention.

POLYMERIC DISPERSANT EXAMPLE

A polymeric dispersant of the present invention was made as follows: A solution of 51.9 grams methacrylic acid; 248.7 grams SIPOMER SEM-25 (containing 60% active ingredient, 20% methacrylic acid and 20% water); 132.08 grams ARONIX M-117 (polymerizable monofunctional vinyl monomers available from Toagosei Co. of Tokyo, Japan); 8.44 grams 1-dodecanethiol; and 0.93 grams dimethyl 2,2'-azobisisobutyrate (V-601) from Waco Chemical & Supply Co. of Dalton, Ga., was mixed in 250 mL isopropyl alcohol (IPA) in a three neck round bottom flask which was equipped with a mechanical stirrer, a condenser and a thermometer. The chemicals were mixed together and degassed with nitrogen (done by repeated partial evacuation followed by backfill using a Firestone Valve). The flask was back filled with the nitrogen, then immersed, in an oil bath and heated to about 78° C. with good stirring for about 18 hours. The product is dried in the oven at 80° C. The molecular weight of the dispersant was determined by gel permeation chromatography. The Mw was about 20,050 and the Mn was about 11,000. The resulting product was dissolved in deionized water with heating. The temperature was controlled to below 50° C. and the pH was adjusted to 7.8 by the dropwise addition of 20% KOH to the solution.

Chemically Prepared Toner Particles

The process for making chemically prepared toner includes preparing a dispersion of wax and dispersant, preparing a mixture of pigment and dispersant, or preparing a dispersion of wax, pigment, and dispersant, combining the wax and dispersant with the pigment and dispersant or pigment, wax and dispersant, and mixing the resulting mixture with binder, deionized water, an organic solvent and acid in a homogenizer. In the process, agglomeration of the colorant particles is preferably controlled by the acid number of the polymeric dispersant. The methacrylic acid (MAA) in the binder preferably contributes little to the agglomeration process as long as the amount of MAA in the binder remains less than about 1 wt. %. Too low an acid number of the dispersant may cause premature precipitation of the particles resulting in a wide particles size distribution. Too high an acid number of the dispersant may prevent or retard precipitation of the particles. Accordingly, by controlling the acid content of the reaction mixture, the particles can be grown to a desired particles size before terminating the particle growth step of the process. The agglomerated particle size is determined by Leeds and Northrop Microtrac UPA 150 and Beckman Coulter Multisizer 3 Coulter counter. The circularity of the particles is determined by a System FTIA particle shape analyzer tool wherein the cirularity ranges from 0.92 to 0.98.

In order to regulate the agglomeration process an organic solvent selected from oxygenated compounds such as ethers, ketones, and $C_2$–$C_6$ alcohols, is used. It is also preferred that the dispersant be made from the same organic solvent used to regulate the agglomeration process. In an aqueous acidic media, the dispersant loses its charge stabilizing stability and tends to precipitate too rapidly. However, with the help of the protective colloid and in the presence of the organic solvent in the media, the stability of the dispersant is not lost. Hence, the organic solvent tends to smooth out the agglomeration process and provide toner particles with a relatively narrow particle size distribution.

The organic solvent also changes the conformation of the dispersant which enables the binder to be closely associated with or adhered to the surface of the wax and pigment thereby greatly reducing reaction time. Other functions of the organic solvent include defoaming and viscosity reduction which helps particle formation in the media. The solvent may also act as a coalescent which lowers the fusing temperature of the toner particles. A preferred organic solvent is selected from isopropyl alcohol and n-propyl alcohol.

A detailed example of a preferred toner making process is now illustrated. This example is provided for illustrative purposes only, and is not intended to restrict or limit the scope of the invention. The following is a substantially surfactant free process.

CHEMICALLY PREPARED TONER EXAMPLE 1

In the process for making the toner, the polymeric dispersant (5 grams) described above was mixed with 120 grams of deionized water and 9.5 grams of WE-3 wax in a steel cup at room temperature. The cup was set on a hot plate and the hot plate was heated to the maximum temperature. After the wax was melted, the mixture of wax and dispersant was homogenized on the highest speed for 7 minutes. The pH of the dispersion was about 8.

Next a dispersion of colorant was made. Pigment red 122 (14 grams), 0.7 grams of charge control agent (LR-147), and 5 grams of the polymeric dispersant described above were added to a plastic cup at room temperature. The pigment, dispersant and charge control agent were mixed with 10 grams of deionized water and the mixture was poured into the hot steel cup. The hot steel cup was maintained at a temperature above 95° C. and the mixture was homogenized on the highest speed for 30 minutes to prepare a pigment concentrate.

The pigment concentrate was then poured into an attritor. The concentrate weight was 65 to 80 grams. The steel cup was washed with 70 to 80 grams of deionized water and the wash liquid was poured into the attritor. The total weight of mixture in the attritor was 160 to 175 grams. Next, 1.25 millimeter YZT shot (1760 grams) was added to the attritor. The attritor was run for 6 hours at full speed with no circulation water, then run for 6 hours with circulation water at 27° C. After running the attritor for 12 hours, the particle size of the dispersant coated pigment solids was 210 to 240 nm. The dispersant coated pigment solids were filtered with steel sieves and the liquid collected. The YZT shot was washed with deionized water to remove traces of the pigment solids from the shot.

The dispersant coated pigment solids (17 grams) was then poured into a gallon plastic beaker and 100 grams of deionized water was added to the beaker. With the homogenizer set to the lowest speed (3000–4000 rpm), 110 grams of the binder were poured into the beaker and the mixture was stirred for 3 minutes. The pH of the mixture was 6.97. The binder was made according to the "Latex Binder Example" described above.

Next, 200 grams of isopropyl alcohol and 1 gram of t-butoxy-2-propanol were poured into the beaker and the mixture was homogenized. Then nitric acid (5.6 grams, 70 wt. %) was dissolved in 400 grams of deionized water and the acid solution was poured into the beaker in a thin stream to obtain a pH below 1.7. The mixture was stirred for one more minute then poured into a reaction flask. The flask was heated with a heating mantle and the reaction mixture was stirred. During the stirring, the temperature was increased as the particle size was checked with a coulter counter. When the desired particle size was reached, preferably about 5.9 microns (number average size), the pH of the mixture was increased to 7.5 by adding 12.5 wt. % NaOH to the mixture. After raising the pH of the mixture, the mixture was held at the same temperature for 10 minutes. Then the temperature was slowly increased to 86° C. while maintaining the pH at 7.5. The temperature of the mixture was held at 86° C. for one hour, then cooled to room temperature. (The holding time is determined by the shape of the preferred toner particle). The resulting toner particles were vacuum filtered, washed with deionized water and dried in an over at 30° C. Toner particles made by the foregoing process were non-spherical or "potato-shaped" and had a relatively narrow particle size distribution.

In an alternative process, a self-dispersing wax can be used provided it doesn't disturb the agglomeration process. Accordingly, the step of dispersing the wax with the polymeric dispersant is not needed when such a wax is used. The following is an example of a substantially surfactant free process.

CHEMICALLY PREPARED TONER EXAMPLE 2

A self-dispersing wax, CERAMER 1251 (25 grams), available from Baker Hughes of was mixed with 300 grams of deionized water in a steel cup at room temperature. The cup was set on a hot plate and the hot plate was heated to a maximum temperature of about 90° C. After the wax was melted, the wax was homogenized on the highest speed for 30 minutes and the pH of the dispersion was adjusted to about 8 by adding NaOH solution (12.5 wt. %) to the dispersion. Next, 200 grams of 80° C. deionized water was added to the steel cup and the mixture was homogenized on the highest speed for another 30 minutes until the particles size was about 200–250 nm. The final solids content was 5–10 wt. %.

Next a dispersion of wax and colorant was made using the same procedure as described above with the exception of the following ingredients. Pigment red 122 (14 grams), 0.5 grams of charge control agent (LR-147), 10 grams of the polymeric dispersant described above and 9.5 grams of WE-5 wax were mixed together.

The pigment concentrate (16 grams) was then poured into a beaker and mixed with homogenizer running at about 3000 to 4000 rpm. Next 110 grams of the binder made according to the "Latex Binder Example" described above, with the exception of the use of 9 grams of MAA rather than 10.5 grams of MAA was poured into the beaker. Then 2.4 grams of the homogenized self dispersed wax (CERAMER 1251) was poured into the beaker and mixing was continued for 3 to 5 minutes. The pH of the mixture was 7.25

Next, 200 grams of isopropyl alcohol and 1 gram of t-butoxy-2-propanol were poured into the beaker and the mixture was homogenized. Then nitric acid (5.6 grams, 70 wt. %) was diluted in 500 grams of deionized water and the acid solution was poured into the beaker in a thin stream to obtain a pH below 1.7. The resulting mixture was poured into a flask having a heating mantle and gradually heated with good mechanical stirring. At about 40 to 45° C., the particle size of the toner reached V 6.85, N 5.94 as determined by a coulter counter. When the desired particle size was reached, preferably about N=5.9 microns, the pH of the mixture was increased to 7.6 by adding 12.5 wt. % NaOH (about 22 grams) to the mixture. After raising the pH of the mixture, the mixture was heated to 86° C. and held at that temperature for 60 minutes. The heating was discontinued and the pH lowered to 6.0 by the addition of dilute nitric acid. The particles size changed to V 7.08, N 5.80. When the mixture cooled to 66° C., the pH was lowered to 5.0 and the particle size was V 7.12 microns, N 5.96 microns. The resulting toner particles were vacuum filtered, washed with acidified deionized water and dried in an over at 30° C. Toner particles made by the foregoing process were non-spherical or "potato-shaped" and had a relatively narrow particle size distribution.

CHEMICALLY PREPARED TONER EXAMPLE 3

Pigment Red 122 was dispersed with the above dispersant at a pigment to dispersant ratio of 5:1 in an attritor with 1.25 millimeter YTZ shot. The wax, WE-5, was dispersed with the dispersant at a ratio of 2:1 at 90° C. with a homogenizer. The pigment dispersion (12 grams) and 17 grams of the wax dispersion were mixed with 200 grams of deionized water in a homogenizer at 3000 to 4000 rpm. The binder (126 grams) was then added into the mixture. After mixing for several minutes, 8 grams of 70 wt. % nitric acid diluted in 500 grams of deionized water were added followed by 200 grams of n-propanol. The final pH was in the range of 1.6 to 1.7.

The mixture was gradually heated while checking the particle size growth using a Coulter counter. When the desired particle size was reached, (V=6.92, N=6.07) at about 39° C., 12.5 wt. % NaOH was dropped into the mixture to raise the pH to 7.55. The mixture was then held for 15 minutes and the temperature was then gradually raised to 90° C. while maintaining the pH at 7.55. The mixture was held at 90° C. for two hours then cooled to room temperature. The product was washed with deionized water, and dried in an oven at 30° C.

In the foregoing examples, a substantially surfactant free process was described. However, the dispersant described above has also been used in a process for making toner wherein a surfactant was used. The following example illustrates a process for using the above described dispersant in a process using a surfactant.

CHEMICALLY PREPARED TONER EXAMPLE 4

A binder, pigment and wax dispersion was made as described in the above examples. The agglomeration process was conducted by first mixing 5 grams of the pigment wax dispersion with 55 grams of the binder and 200 grams of deionized water in a homogenizer with a speed of 3000 rpm. Next, 200 grams of 1 wt. % aluminum sulfate and 150 grams of isopropyl alcohol was added to the mixture. (The isopropyl alcohol can also be added at a higher temperature before reaching the final particle size). The mixture was poured into a flask equipped with a mechanical stirrer and the flask was heated slowly until the desired particles size (usually V=6 to 7 and N=5 to 6) was obtained as determined by a Coulter counter. The pH was then raised to 7.66 and held at this temperature for 30 minutes. An alkylaryl polyether alcohol (7 grams of 28 wt. % solution TRITON X-100 available from Union Carbide of Danbury, Conn.) was added to the mixture. The mixture was heated gradually to 82° C. and held there for 1 to 3 hours depending on the desired shaped of the toner particles. Then the mixture was cooled to room temperature and the product was filtered. The product was thoroughly washed with deionized water to complete the removal of the surfactant and excess aluminum salt. Then the product was dried in an oven at 30° C.

While specific embodiments of the invention have been described with particularity herein, it will be appreciated that the invention is applicable to modifications, and additions by those skilled in the art within the spirit and scope of the appended claims.

What is claimed is:

1. Chemically prepared toner for electrophotographic printers, consisting essentially of agglomerated polymeric dispersant stabilized pigment particles, a fuser release agent, a charge control agent dispersion, and a self-stabilized essentially surfactant free latex binder, wherein the polymeric dispersant includes at least two segments, a hydrophilic polymeric segment and a protective colloid or reactive surfactant segment, the polymeric dispersant having a weight average molecular weight ranging from about 5,000 to about 30,000 as determined by gel permeation chromatography and a hydrophobicity ranging from about 10 to about 90 percent by weight, wherein the chemically prepared toner includes agglomerated toner particles having a unimodal particle size distribution with a number average particle size (N) ranging from about 5.0 to about 8.5 microns, a volume average particle size (V) ranging from about 5.0 to about 8.5 microns, and wherein V minus N (V-N) ranges from about 0 to about 1.5.

2. The chemically prepared toner of claim 1, wherein the agglomerated pigment particles have a substantially irregular shape.

3. The chemically prepared toner of claim 2, wherein the agglomerated pigment particles have a substantially oblong shape.

4. The chemically prepared toner of claim 1, wherein the polymeric dispersant contains at least three segments, a hydrophilic polymeric segment, a hydrophobic polymeric segment, and a protective colloid segment.

5. The chemically prepared toner of claim 4, wherein the polymeric dispersant is derived from a free radical polymerization reaction of a reaction mixture including a hydrophilic component selected from the group consisting of acrylic acid monomer and alkylacrylic acid monomer, a hydrophobic component selected from the group consisting of an alkylarylpoly($C_3$–$C_{10}$-alkylene)glycol alkylacrylate, a polydimethylsiloxane methacrylate, and a polydimethylsiloxane-co-poly($C_3$–$C_{10}$-alkylene)glycol methacrylate, and a protective colloid component selected from the group consisting of a tri-alkylarylpolyethyleneglycol alkylacrylate, and a polydimethylsiloxane-co-polyethylene glycol methacrylate.

6. The chemically prepared toner of claim 5, wherein the latex binder is derived from reaction mixture including water, alkenylarylsulfonic acid salt, alkenylbenzene, persulfate, alkylacrylate, alkylacrylic acid, hydroxyalkylmethacylate, alkylmecaptan, and alklydiacrylate, and wherein the latex binder has a weight average molecular weight ranging from about 30,000 to about 70,000 as determined by gel permeation chromatography.

7. The chemically prepared toner of claim 1, wherein the polymeric dispersant comprises a polymer having a monomeric hydrophobic head and a polymeric tail, wherein the hydrophobic head is represented by the formula:

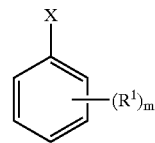

wherein m is an integer from 1 to 3, X is a polymerizable group, connected to the aromatic group though —O—, —N— or —S—, and each $R^1$ is independently selected from $C_1$–$C_9$ alkyl, or aryl-$C_1$–$C_9$ alkyl, provided that at least one of said $R^1$ is aryl-$C_1$–$C_9$ alkyl, and wherein the polymeric tail comprises a group selected from the formula:

and the formula:

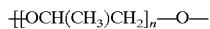

wherein n ranges from 0 to 30 that is attached to an alkylacrylo functional group that provides a polymerizable backbone for the dispersant.

8. The chemically prepared toner of claim 1 wherein, the fuser release agent comprises a wax selected from the group consisting of polyolefin waxes, metal salts of fatty acids, fatty acid esters, partially saponified fatty acid esters, higher fatty acid esters, higher alcohols, paraffin waxes, amide waxes, and polyhydric alcohol esters.

9. A method for making toner particles for electrophotographic printers, the method comprising the steps of:
   contacting a dispersion containing pigment particles associated with a fuser release agent, with a latex binder dispersion, and with a polymeric dispersant having a hydrophilic polymeric segment, a hydrophobic polymeric segment, and a protective colloid or reactive surfactant segment, and having a weight average molecular weight ranging from about 5,000 to about 30,000 as determined by gel permeation chromatography, and a hydrophobicity ranging from about 10 to about 90 percent by weight to provide a toner mixture;

adding a destabilizing agent to the toner mixture while stirring the mixture at an elevated temperature to agglomerate toner particles wherein the agglomerated toner particles have a substantially unimodal particles size distribution with a number average particle size (N) ranging from about 5.0 to about 8.5 microns, a volume average particle size (V) ranging from about 5.0 to about 8.5 microns, and wherein V minus N (V-N) ranges from about 0 to about 1.5; and filtering and recovering the agglomerated toner particles.

10. The method of claim 9, wherein the polymeric dispersant is derived from a free radical polymerization reaction of a reaction mixture including a hydrophilic component selected from the group consisting of acrylic acid monomer and alkylacrylic acid monomer, a hydrophobic component selected from the group consisting of an alkylarylpoly($C_3$–$C_{10}$-alkylene)glycol alkylacrylate, a polydimethylsiloxane methacrylate, and a polydimethylsiloxane-co-poly($C_3$–$C_{10}$-alkylene)glycol methacrylate, and a protective colloid component selected from the group consisting of a tri-alkylarylpolyethyleneglycol alkylacrylate, and a polydimethylsiloxane-co-polyethylene glycol methacrylate.

11. The method of claim 9, wherein the latex binder dispersion includes a latex binder derived from reaction mixture including water, alkenylarylsulfonic acid salt, alkenylbenzene, persulfate, alkylacrylate, alkylacrylic acid, hydroxyalkylmethacylate, alkylmecaptan, and alkyldiacrylate, wherein the latex binder is substantially free of surfactant and has a weight average molecular weight ranging from about 30,000 to about 70,000 as determined by gel permeation chromatography.

12. A method for agglomerating chemically prepared toner particles to provide chemically prepared toner particles having a relatively narrow size distribution, the method comprising the steps of:

dispersing pigment, a charge control agent, and a wax with a polymeric dispersant in an aqueous medium to provide a dispersed pigment and wax, the polymeric dispersant having a hydrophilic polymeric segment, a hydrophobic polymeric segment, and a protective colloid or reactive surfactant segment, and having a weight average molecular weight ranging from about 5,000 to about 30,000, and a hydrophobicity ranging from about 10 to about 90 percent by weight;

combining the dispersed pigment and wax with a surfactant free latex binder in an aqueous medium containing alcohol to provide an agglomerating mixture at a pH ranging from about 1.0 to about 2.0 at about room temperature;

raising the temperature to a temperature above room temperature sufficient to provide toner particles having a desired particle size;

raising the pH of the agglomerating mixture when the desired particles size is obtained;

heating the toner particles to fuse the binder to the particles; and recovering agglomerated toner particles containing wax, binder and dispersant.

13. The method of claim 12 wherein the agglomerating mixture is acidified to a pH ranging from about 1.0 to about 2.0 after adding alcohol to the agglomerating mixture.

14. The method of claim 13 wherein the mixture is acidified at a temperature ranging from about 20° to about 50° C.

15. The method of claim 12 wherein the agglomerating mixture is acidified to a pH ranging from about 1.0 to about 2.0 before adding alcohol to the agglomerating mixture.

16. The method of claim 15 wherein the mixture is acidified at a temperature ranging from about 20° to about 50° C.

17. The method of claim 12 wherein the pH of the agglomerated mixture is raised to a pH above about 7.5.

18. The method of claim 12 wherein the binder is fused to the toner particles at a temperature ranging from about 75° to about 90° C.

19. The method of claim 12, wherein the polymeric dispersant is derived from a free radical polymerization reaction of a reaction mixture including a hydrophilic component selected from the group consisting of acrylic acid monomer and alkylacrylic acid monomer, a hydrophobic component selected from the group consisting of an alkylarylpoly($C_3$–$C_{10}$-alkylene)glycol alkylacrylate, a polydimethylsiloxane methacrylate, and a polydimethylsiloxane-co-poly($C_3$–$C_{10}$-alkylene)glycol methacrylate, and a protective colloid component selected from the group consisting of a tri-alkylarylpolyethyleneglycol alkylacrylate, and a polydimethylsiloxane-co-polyethylene glycol methacrylate.

* * * * *